Aug. 10, 1965    P. E. RUSS ETAL    3,200,180
METHOD OF CASTING ARTICLES FROM LIQUID ELASTOMERS
Filed Feb. 15, 1962    2 Sheets-Sheet 1
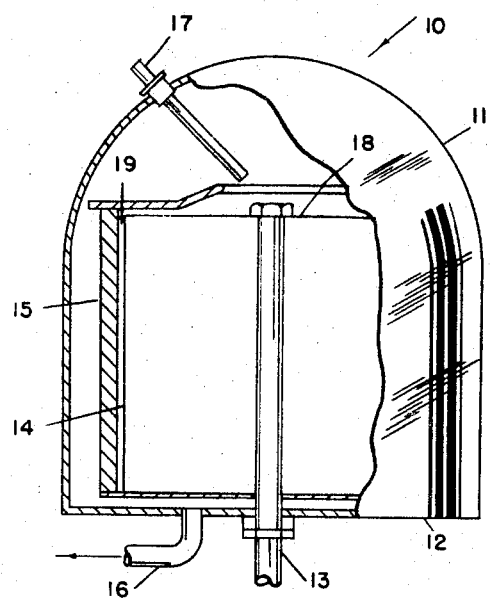
FIG. 1
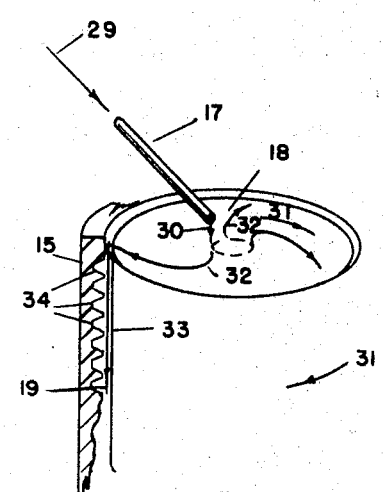
FIG. 2
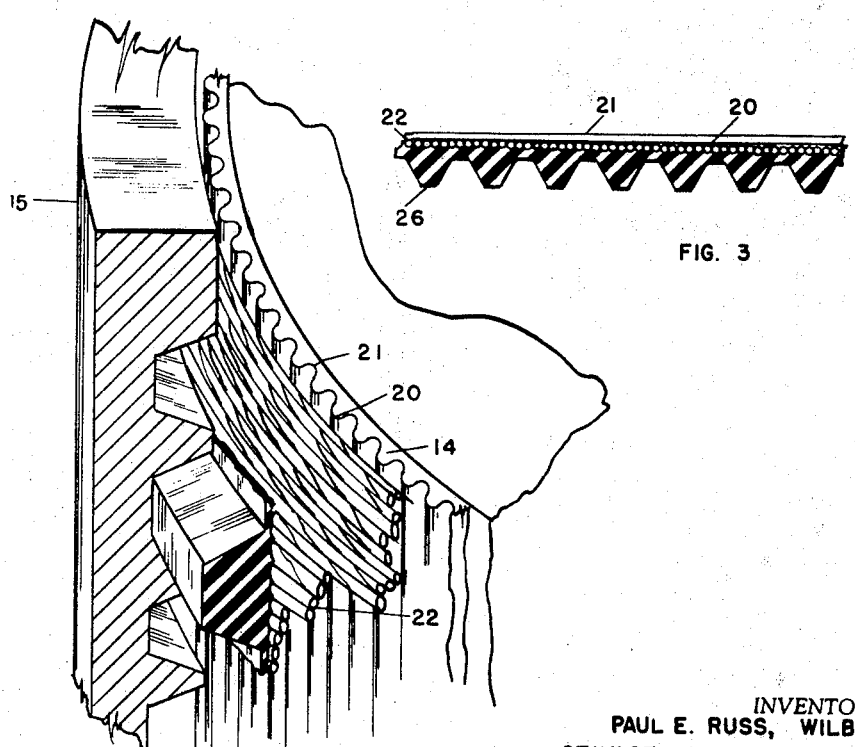
FIG. 3
FIG. 4
INVENTORS
PAUL E. RUSS, WILBUR
STAVAST, WILLIAM M. HAINES
BY
*Raymond Fink*
ATTORNEY Aug. 10, 1965   P. E. RUSS ETAL   3,200,180
METHOD OF CASTING ARTICLES FROM LIQUID ELASTOMERS
Filed Feb. 15, 1962   2 Sheets-Sheet 2

INVENTORS
PAUL E. RUSS, WILBUR
STAVAST, WILLIAM M. HAINES
BY
Raymond Fink

ATTORNEY

United States Patent Office 3,200,180
Patented Aug. 10, 1965

3,200,180
METHOD OF CASTING ARTICLES FROM LIQUID ELASTOMERS
Paul E. Russ, Englewood, Wilbur Stavast, Denver, and William M. Haines, Englewood, Colo., assignors to The Gates Rubber Company, Denver, Colo., a corporation of Colorado
Filed Feb. 15, 1962, Ser. No. 173,504
14 Claims. (Cl. 264—102)

The present invention relates to an improved method of casting articles from a liquid elastomeric material. More particularly, the invention relates to articles having a large volume and to a method for casting such articles from viscous, rapidly polymerizing elastomeric liquids.

The present invention concerns the improvement for casting and fabricating articles composed of a homogeneous elastomeric liquid which in its uncured state is viscous and flows only with difficulty. Further, such material is characterized by a fast polymerization or curing mechanism which necessitates comparatively rapid manufacturing procedures for the casting of such articles before the material polymerizes to such an extent that it is no longer capable of additional flow. The method herein described is particularly adapted for the casting of articles of comparatively large volume. Additionally, the method is characterized by the fact that it may easily be adapted to accommodate accurate placement of reinforcing elements, such as fabric or cord within the article, and to provide further for thorough and complete impregnation of the interstices of such reinforcing material with the polymeric liquid.

The method herein described has been adapted for the casting of articles characterized by large volumes, such as a sleeve, comprising a plurality of shaped power transmission belts in which is accurately placed a strain resisting element, tires which may be homogeneous throughout or in which bead elements have been placed, and other molded mechanical articles in which reinforcing elements may be accurately placed. The reinforcing elements may be composed of a natural or synthetic fiber or of wire or may be other types of reinforcing elements, such as bundles of elements forming a unitary structure such as the tire bead. The polymeric material from which the articles are cast are characterized by being extremely viscous and lethargic to flow in its uncured state and which additionally cures to a solid elastomeric form in a very short period of time.

As a matter of illustration, there will first be discussed how the method herein described is particularly well adapted toward the casting of articles having large volumes and in which a cord reinforcing element is placed. Such an article might be a large sleeve comprising a plurality of shaped power transmission belts. According to methods well-known in the art, it has been a common practice to build power transmission belts in a sleeve-like fashion in which separate layers of materials are carefully placed and can be separately treated and fabricated for necessary building and performance characteristics. Such belts generally contain fibers or yarns or fabric forming a strain resisting element within the belt and are treated in order to impart to such material desired adhesive and performance characteristics. Additionally, such various components and materials possess characteristics which adapted themselves particularly well toward fabrication of the articles by means of laminating the various components to form a unitary structure. However, with the advent of polymeric materials which in their cured state have superior physical characteristics which are particularly applicable to accommodate dynamic forces and stresses, it became apparent that entirely new and improved methods of fabrication would be necessary. New and improved methods were required since many of the polymers in their uncured state are of a viscous nature and flow only with the utmost difficulty. Additionally, once a curing agent is added to such materials, the polymerization mechanism proceeds with such rapidity that for all practical purposes, as far as the casting and fabrication procedure is concerned, the polymer becomes a solid in a matter of minutes or even seconds. It was soon obvious that with such characteristics the well-known fabrication procedures prevalent in the rubber industry were completely inapplicable.

Not only are the well-known fabrication procedures in the rubber industry inapplicable, but it was soon obvious that generally utilized casting procedures are also unsatisfactory. The high viscosity of the materials present adverse characteristics during the casting procedures which necessitate modification of the well-known casting methods. It has been found that with articles subjected to dynamic stresses and forces, it is necessary to provide a means for thoroughly impregnating the interstices of fabric reinforcing material which may be incorporated within the body of the articles of manufacture. In addition, because of the very viscous nature of the polymer and because of the difficulty of flow of the polymer, entrapment of gases or non-fill areas would be encountered during the casting of such articles if well-known casting methods were utilized. This is particularly evident with the castings of articles having large volumes in which the rapid cure and high viscosity of the casting material tended to create encapsulement of void areas or even complete non-fill areas, especially as the polymer advanced further away from the area of introduction of the liquid. However, regardless of the volume of the article to be cast, it was also found that if the profile of the article possessed any degree of complexity, non-fill at the intricate regions of the mold would result. Another factor that necessitated modifications of generally known casting methods was the necessity of obtaining complete impregnation and penetration of the interstices of reinforcing elements before the polymer became so viscous as to preclude such complete impregnation of the interstices. It was found that such complete impregnation is an absolute necessity to obtain improved products capable of withstanding severe dynamic conditions such as power transmission belts.

As a consequence of the adversity presented to normal fabrication or casting methods, the present invention was conceived to enable more readily the complete filling of a mold for the casting of large volumes or intricate shapes with polymeric materials possessing a very viscous characteristic. In addition, this improved method enables one to obtain complete penetration and impregnation of interstices of a reinforcing element which is designed to be encompassed by the casting material within the object cast. Additionally, the method lends itself well for accurate placement of such reinforcing elements within the body of the material. In power transmission belts, for example, a great deal of success or failure of the performance of the belts depends upon accurate placement of the strain resisting element within the belt and with respect to other strain resisting elements.

It is therefore an object of the present invention to provide an improved method for the casting of articles of large volumes from viscous polymeric materials which flow with a great deal of difficulty.

It is still another object to provide for a method of casting articles in which may be accurately placed, reinforcing elements such as cord or fabric within the body of the object to be cast, such element to be accurately placed not only in regard to its relationship within the body itself, but in relation to other reinforcing elements.

It is still a further object to provide for a method of filling a mold with a viscous polymeric material whereby entrapment of void areas is eliminated and whereby non-fill areas are avoided.

It is a further object to provide for the rapid filling of a mold containing a large volume with a slow moving viscous polymeric material characterized by rapid polymerization before such material has had a chance to polymerize to such an extent as to preclude complete filling of the mold.

It is an additional object to provide for a method for the unitary casting of an article whereby reinforcing elements may be accurately placed and formed as a unitary structure within the cast object.

It is still a further object to provide for complete penetration and impregnation of interstices within reinforcing elements whereby such interstices are completely filled throughout with the polymeric material from which the object is cast.

It is still an additional object to provide a method for the casting of articles of a large volume from a viscous rapidly setting material with the elimination of the tendency to encompass minute bubbles within the body of the object.

It is additionally another object to provide a method for the casting of intricately shaped articles with a viscous polymeric material and obtain perfectly shaped and filled castings.

It is still an additional object to provide a method of casting an article comprising a density gradient of the same or of different materials or comprising a lamination of cast materials.

In accordance with the present invention, it has been discovered that the above desired objectives and other objects which will become obvious may be fully realized by means of a method whereby, generally speaking, the profile of the object to be cast is provided by formation of a cavity with an outer mold shell within which is concentrically placed a profiled mandrel which may support reinforcing elements. For some purposes, articles may be cast from extremely viscous and slow moving but rapidly curing polymeric liquids by first of all completely evacuating by means of a vacuum the cavity formed by the mandrel and mold and by further evacuating the interstices of the reinforcing material which has been placed upon the supporting mandrel. It has been discovered that this technique of vacuum casting is by itself sufficient for accomplishing the complete permeation and impregnation of the fabric or cord material or other reinforcing element containing a multitude of interstices by the viscous polymer. Further, it has been found that with small sections of articles to be cast, such vacuum technique is also sufficient to eliminate entrapment of void areas or to completely eliminate the problem of non-fill sections.

However, with larger or more intricately profiled volumes to be cast, it has been found that mere vacuum alone is not sufficient to avoid non-fill conditions or non-impregnation of the reinforcing elements. Substantially complete evacuation is still necessary with large sections to provide for the complete impregnation and penetration of the interstices of the reinforcing elements by the polymeric material for the prevention of possible formation of minute bubbles. However, in order to eliminate areas of non-fill of objects which contain a large volume and which have areas that are of a greater distance from the entry port through which the viscous material is introduced, it is also necessary to provide additional means for rapidly forcing the material to all sections of the cavity to be filled. One method for accomplishing this purpose is to provide for large pressure differentials above and beyond the differential created by evacuation alone. The volume to be filled is subjected to the lesser of the differential pressures. Force would thereby be created to force the material into the cavity section. Such pressure differential can be obtained by subjecting the cavity area to a large centrifugal force created by rapidly rotating the mold shell and the encompassed mandrel around a central supporting axis. Such rapid rotation creates a varying pressure differential according to the distance from the center of rotation. This large pressure differential in combination with the sustained evacuation of the mold cavity enables rapid filling of even very large volumes having very intricate mold designs and configurations. With such rapid filling, it is now possible to accomplish complete mold filling without the encompassment of void areas and before the polymeric material has had an opportunity to polymerize to such a degree as to effectively eliminate further flow of the polymeric material.

In addition, it has been discovered also that even as mere evacuation alone is not sufficient, neither is centrifugal casting alone sufficient. If the mold cavity is subjected only to centrifugal force, it has been discovered that the viscous polymeric material will not be forced into the interstices of reinforcing element by the casting material. As has been stated before, it has been found that with many objects which undergo severe dynamic working conditions, it is absolutely necessary to obtain such penetration of the reinforcing elements. Only by means of such impregnation it is possible to obtain power transmission belts which possess superior characteristics and which provide outstanding results. Further, even if it is not necessary to impregnate a reinforcing element, such as a tire which contains no reinforcement, centrifugal casting by itself will result in the encompassment of a multitude of minute bubbles, especially in the outer portions of the mold. It is obvious that an article containing such bubbles, such as a tire or other types of massive articles possess many inferior characteristics within that portion containing such bubbles and would be subject to early failure at that portion.

Additional features and advantages will become more apparent from the following description taken in conjunction with the accompanying drawings illustrating by way of example of various embodiments thereof, in which:

FIGURE 1 is a typical view of a casting assembly for carrying out the method of casting as embodied within the present invention;

FIGURE 2 is a diagrammatic view of a mold assembly indicating the manner in which the present invention aids the filling action of the mold assembly by the liquid polymeric material;

FIGURE 3 is a cross section of a sleeve of power transmission belts as cast according to the method of the present invention;

FIGURE 4 is a fragmentary perspective view of a V-shaped belt mold for use in a casting assembly, together with a V-belt cross section formed in accordance with the method of the present invention;

Figure 5:
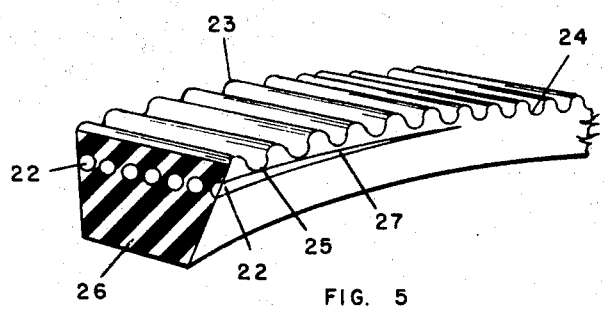
FIGURE 5 is a fragmentary perspective view of a V-belt section formed in accordance with the present invention.

With more particular reference to the drawings, there is shown in FIGURE 1 a casting assembly 10 broadly comprising an outer vacuum chamber 11, a platform 12 upon which the vacuum chamber rests, a central rotatable shaft 13 extending from the outside of the vacuum chamber through the platform into the chamber upon which is supported an interior mandrel 14, and an outer spaced concentric mold shell 15. The vacuum chamber 11 may be evacuated by an exhaust line 16 which is connected to a vacuum pump (not shown). The liquid casting material is introduced by means of an entry port 17 which is directed toward the top of a distributing plate 18. As the assembly is rotated, the liquid elastomer is forced to the outer regions by means of centrifugal force and by means of a baffle system and guide system incorporated as part of the distributing plate 18. From the outer region of the plate the material is then directed to the cavity 19 defined between the central mandrel 14 and the outer mold shell 15.

Further examination of the mandrel 14, as can be more easily seen from FIGURE 4, indicates that the surface may be corrugated by the formation of a series of radiused ridges 20 and alternating radiused grooves 21 extending around the periphery of the mandrel in a direction parallel to the longitudinal axis of the mandrel. Thus, in carrying out the method of the present invention and prior to the enclosure of the mandrel 14 within the outer mold shell 15, a tensile member or strain resisting element 22 may be continuously wound around the mandrel in direct contact with and supported by the series of ridges 20. As shown in FIGURE 5, the successive turns of the strain resisting member may be spaced apart from one another, or on the other hand, the successive turns may be contiguous to one another as shown in FIGURE 3. At any rate, the series of adjacent ridges 20 provide a support upon which the strain resisting member 22 may be accurately positioned.

Another method that has been utilized to properly position the cord on the mandrel is to provide a spiral groove on the periphery of the mold mandrel progressing in a direction parallel to the axial direction of the mandrel. Thus, one may inscribe on the periphery the exact pitch and space relationship that one wishes to attain with the cord tensile member of the belt. This procedure would be particularly advantageous with mandrels having large diameters in which the centrifugal force at the periphery is of a large degree. On such large diameter molds when the centrifugal force created is large, the cord perhaps might tend to become displaced from the position desired. Such a positioning means as a groove just described would help the cord maintain its proper pitch and space relationship.

The tensile member may be formed from a continuous layer of cords which are successively wound snugly and evenly around the mandrel or may be a layer of fabric or other suitable means. If a single continuously wound cord is used, generally better results may be obtained if the cord is placed upon the mandrel under a predetermined degree of tension from one end to the other and may be suitably but snugly and evenly spaced from the adjacent turns. Different types of cord, such as cotton or wire, or synthetic cords, such as rayon, nylon or polyester, may be used. Different cords require different types of treatment in order to impart dimensional stability. Also, according to the type of cord used, the cord may be pretreated or previously processed as desired in any way prior to the wrapping onto the mandrel.

Other methods have been successfully used for either providing reinforcing elements or for stiffening the undercord section of power transmission belts. In the past, batting comprising unwoven fabric has been successfully used to reinforce the undercord section. Additionally, one may use short fiber linters which are mixed in with the polymer to provide reinforcing characteristics. Additionally, the batting is particularly well adapted for forming the tensile member section in that it may be easily placed by means of placement around the mandrel. The method is particularly well adaptable for these types of materials in that the influence of the vacuum and centrifugal force insure that complete filling of the interstices between such linters or unwoven fabric will be filled and the reinforcing material will be completely integrated with the structure of the article being cast.

After the tensile member 22 has been carefully and accurately placed upon the mandrel 14, the assembled mandrel may then be placed concentrically within the outer mold shell 15. The mandrel and the mold may be assembled into a single coacting element thereby defining a cavity between the two elements by various means. Thus, the weight alone of the mold shell and the mandrel might be sufficient to securely position the two elements. Other methods that have been satisfactorily utilized have been by means of bolts, magnetic forces or by assembly to the base plate of the mold. The assembled mold is then connected to the central shaft 13. The shaft generally is positioned so that it coincides with the central axis of rotation of the assembled mold portion. A positive connection is provided whereby when the shaft 13 is caused to rotate, the mold assembly also will rotate in coacting relation with the shaft. The means for rotation of the shaft is not shown but such rotation can easily be accomplished by connection such as with V-belts of the lower end of the shaft with a motor which can be controlled to be operated at variable speeds. Thus, one may govern the speed of rotation of the shaft by means of governing the speed of the driving motor.

The assembled mold is thus placed upon the shaft and the outer vacuum chamber 11 is then placed upon the supporting platform 12 and a seal is made between the chamber and the platform. The vacuum pump is then connected to the exhaust line and the chamber is evacuated of its residual air. Generally, it has been found that by evacuating the chamber to a vacuum of from 20 to 7 millimeters of mercury, essentially most of the residual air can be removed not only from the enclosed mold cavity, but also from the interstices encompassed within the cord or fabric reinforcing element. Thus, after the outer chamber has been placed in a sealed relation upon the supporting platform 12, the chamber is evacuated until the proper degree of vacuum is reached.

Practically speaking, it has been found that in order to enable the plastic material to remain as fluid as possible, the cavity area and the mold sections should be subjected to a slightly elevated temperature. It should be remembered that the polymer generally undergoes competing reactions. Elevated temperature generally will hasten the rate of polymerization and, therefore, ultimately decreases the working time before the polymer has set up to such an extent as to preclude fluidity of the polymer. On the other hand, the viscosity of the polymeric material also will vary inversely to the temperature to which it is subjected. Therefore, if the temperature is elevated, the material will exhibit a greater degree of fluidity. If, on the other hand, the material is subjected to low temperature, the viscosity of the material will be increased substantially. It has been found that a slight degree of temperature increase will enable the polymer to flow more readily without increasing the rate of polymerization to such an extent as to prevent casting the material.

To aid in the flow characteristics of the material, it has been found that it is desirable to preheat the mold cavity and the mold sections, as stated before. One may accelerate the heat transfer to the mold by completely assembling the mold within the mold cavity and initiate rotation of the mold to a minimum degree. Such rotation is continued until the mold sections have reached the desired temperature. With the preferred system hereafter described, it has been found that satisfactory results are obtained if the mold sections are heated to 200° F. At this point one may then introduce the viscous polymeric liquid to the mold cavity. Before introduction of the polymer, the rate of rotation is increased to the proper degree. The centrifugal speed of the mold will be determined by the formulation of the material to be added. According to the formulation of the material, centrifugal speeds of up to 1300 r.p.m. have been used. On the other hand, for the actual rotation speed during the introduction of the polymeric material, speeds as low as 350 r.p.m. have been found to be helpful. With the system hereafter described, a rotational speed of the mold during filling of 1100 r.p.m. is satisfactory.

The polymeric material is introduced through the entry tube 17. Before the introduction of the material, the temperature of the vacuum chamber and of the material is brought to the desired level and the mold is rotated at the proper speed. Past experience has indicated that introduction of the material is most carefully controlled by first computing the volume of the cavity which is to be filled. An equivalent volume of elastomeric material is then prepared, and a slight excess is allowed to insure complete filling. The entire amount is then introduced from a reservoir into the mold cavity, and the excess also is allowed to be introduced into the vacuum chamber. It has been observed that as the liquid is caused to flow into the cavity under influence of the centrifugal force and vacuum, the liquid will flow even into the most intricate shaped of the void spaces defined by the mold, such as the alternating ridges 20 and grooves 21 in FIGURE 4. Additionally, if an insert is present, the liquid completely penetrates and impregnates any interstices within the insert. The liquid completely surrounds each of the insert elements and upon curing, the insert is incorporated to form a continuous body completely integrated so as to form a unitary construction.

During the casting operation, it is therefore seen that both the vacuum force and a centrifugal force are imposed upon the system. The evacuation is maintained during the entire casting operation as is the centrifugal action. Both actions may be discontinued immediately upon completion of the casting operation; however, in order to aid in the heat transfer, as stated before, it has been found expedient to maintain the centrifugal motion in order to more efficiently maintain a uniform temperature at least until the polymer has become rigid. With the material most commonly used and which will be described more fully, the object is allowed to cure for a period of time within the vacuum chamber. The mold may then be removed and placed in a curing oven which is maintained at an elevated temperature for a subsequent period of time after which the outer mold shell may be removed. In order to properly impart dimensional stability to the belt sleeve, complete cure generally is conducted while the sleeve is retained upon the inner mandrel.

The characteristics of the material handled in this type of operation are such that the latter part of the curing operation or polymerization of the material may be carried out substantially without the outside mold shell. If this is done, additional parts are free for further processing. As was previously mentioned, this process is particularly designed for those types of materials which polymerize very rapidly upon addition of the curing or polymerization agent. Thus, once the polymerization reaction is initiated, it remains a matter of time before the material has polymerized to such a degree that the outer mold shell may be removed without distorting or disrupting the assumed configuration of the polymerized material. The final polymerization or cure can then be carried on without the outer mold shell 15, thus allowing this part to be used in other casting operations.

A cross section of the belt sleeve after it is removed from the mandrel 14 is shown in FIGURE 3. It is seen that by means of the present process a plurality of separate but connected power transmission belts is formed. Examination of FIGURE 5 indicates alternating rib portions 23 and groove portions 24 on the belt sleeve. As was previously explained, the ribs 23 and grooves 24 are the cast opposite of the alternating ridges 20 and grooves 21 on the outer peripheral surface of the mandrel 14. It was previously explained that the ridges 20 of the mold mandrel support the reinforcing elements as they are wound around the mandrel. The resulting cast product, therefore, will encompass these reinforcing elements at the bottom portion 25 of the belt groove 24. It is felt that the vacuum pressure and centrifugal force utilized in this invention induces the liquid casting material to form a film between the cord and the mandrel ridge 29. For this reason, and furthermore, for the reason that the liquid material completely penetrates and impregnates the cord tensile member, the material completely surrounds each of the fibers forming the individual yarns of the cord and forms a continuous body section extending around the cord. Thus, the cord is held securely within the body portion of the belt and is, in effect, united or integrated into the body section so as to form a unitary belt structure.

As was mentioned previously, the polymerization process may be carried on in the presence of elevated heat and may be continued to its conculsion with the outer mold shell removed. It has been found that with some compositions, the subsequent heat treatment or tempering imparts a very desirable characteristic to the compound even after the apparent polmerization mechanism has been completed. Following the complete polymerization and subsequent treatment of the belt, the formed sleeve of belts may then be removed from the mandrel and the individual belts may be formed by conventional cutting or skiving operation in order to cut the band into individual belts. As can be seen from FIGURE 5, the resulting belt construction comprises a continuous layer of evenly spaced tensile members 22 forming the tensile section of the belt and disposed at the base of the alternating rib portions 23. The undercord section 26 of the belt can be formed into the conventional truncated V shape of the normal V-belt. However, the shape may be varied as desired and the angle of the included V of the belt section can be varied merely by changing the contour of the surrounding mold shell. In this manner, belts of different sections can easily be formed. The important feature, however, is that by virtue of this invention complete penetration of the tensile member can be obtained. In addition, the undercord section 26 and the top section can be cast so as to have no inclusion of void spaces or bubbles and, furthermore, completely filled cast sections can be obtained regardless of the intricacy of the contour of the article to be cast. It is obvious that during the cutting operation the belt may be cut to different desired widths regardless of the disposition of the cord in the cast article. Since the cord has been completely surrounded and impregnated by the polymeric material, it has become completely integrated with the body section. Therefore, even if a portion of a cord strand should be cut as illustrated by the edge cord 27, there will be no danger of edge fraying during the operation of the belt due to its integration within the belt body and its complete impregnation with the polymeric material.

It is obvious that the centrifugal action of this process allows one to fabricate products of different compositions. Thus, one may meter together components having a different gravity from one another. The centrifugal force created by the component is governed in part by the weight of the product. Therefore, if two components are present, one having a gravity greater than the other, the component with the heavier gravity will therefore be forced to that part of the mold represented by the larger diameter. The article formed, therefore, will consist of a laminated structure in which the heavier material is at the outer regions.

Additionally, the process also lends itself to another type of fabrication procedure. One may meter an amount of material into the mold thus partially filling the outer extremity of the mold volume. After this component has polymerized to a degree as to exhibit some rigidity so as to maintain the shape of that portion of the mold filled, another component may then be added. This component will be forced against the first component added and the remaining portion of the mold volume may then be filled with the second component. Of course, one is not limited merely to two components but may carry out this process with as many components as desired. This procedure has been found to be particularly helpful with cogged belts wherein it is desirable to form the cogs of a harder material than the remaining portion of the belt.

Many types of materials are available which due to their nature require special casting procedures in order to obtain satisfactory products. The above described casting operation can be successfully utilized with such polymerizable liquid elastomers such as plastisols, organosols, liquid chloroprenes, liquid polysulfides, depolymerized natural rubber, silicones, epoxides, urethanes, carboxylated butadiene-acrylonitrile, polyester based resins, polyether based resins, together with others. It has been found that particularly good results may be obtained with the use of polyurethane elastomers which possess improved desirable physical properties and characteristics essential for satisfactory performance imposed by the higher requirements of power transmission belts and in automotive tires. Polyurethane elastomers may be compounded to possess especially high tensile strength, abrasion resistance, solvent resistance, ozone resistance and tear resistance, which are extremely desirable in power transmission belt applications. On the other hand, in spite of these desirable characteristics, satisfactory modulus and elasticity are also available in addition to ranges of hardness which may be desired. Of additional importance is the availablility of these polymerized rubber-like materials to be compounded in such a manner that very good flexibility and heat build-up resistance and dynamic stress decay resistance may be obtained. For instance, one such polyurethane rubber sold under the tradename of Adiprene L-100 and having a free NCO content of approximately 1.4% by weight can be compounded to contain varying amounts of plasticizers or other compounding ingredients according to characteristics desired. It has been found that 13 parts of 4,4'-methylene - bis - (2-chloroaniline) sold under the tradename Moca is a satisfactory polymerizing agent which will give resulting desirable characteristics.

In order to minimize the degree of entrapped fluids, such as air, it has been found desirable to degas the polymer and other compounding ingredients before the polymerizing agent is added. Thus, the proper amount of polyurethane polymer is weighed into a clean can or metering device. Other desirable compounding ingredients such as a plasticizer, such as dioctylphthalate, may be added at this time in order to impart softening or improved flexibility. The prepolymer, along with the other compounding ingredients, is then mixed together and heated to an elevated temperature, such as 190° F. in order to reduce the viscosity and to provide further more desirable handling characteristics. The container containing the prepolymer and other compounding ingredients is then placed in a vacuum chamber for degassing. The vacuum is slowly pulled down to approximately 7 millimeters of mercury and held for a short period of time during which constant mechanical stirring is provided. Thus, the entrapped fluids are removed from the bulk of the material to be cast. Such removal of entrapped fluids will, as mentioned previously, aid in providing for bubble free castings.

During the preparation of the prepolymer and other compounding ingredients the mandrel upon which any desired reinforcing inserts have been placed is then inserted concentrically within the outer mold shell. A cavity is thereby formed between the mandrel and the outer mold shell defining the contour of the article which is to be cast. The assembled mold is then placed upon and positively connected to the rotatable shaft 13. The vacuum chamber 11 is then placed over the entire assembly and a seal is formed between it and the supporting platform 12. The entire assembly is evacuated by means of the exhaust line 16 and the attached vacuum pump. In order to facilitate the manufacturing procedure, the vacuum cavity, along with the inserted mold assembly, is heated to a temperature of approximately 200° F. In order to aid the heat exchange mechanism, the mold assembly is caused to be rotated by means of the shaft 13 at a rate of approximately 1100 r.p.m. Concurrently the entire assembly is evacuated to a pressure of approximately 7 millimeters of mercury. As soon as the temperature and vacuum have reached an equilibrium, one may then proceed with the additional casting operation.

After the prepolymer and the other compounding ingredients are completely degassed, the polymerizing agent, such as the Moca, is then added and thoroughly incorporated into the mixture. The polymerization begins immediately, and the casting operation must now be concluded in a rapid fashion in order to accomplish complete filling of the mold cavity and in order to completely penetrate and impregnate any reinforcing inserts. The material is introduced into the mold cavity by means of the entry tube 17 which is directed toward the top of the distributing plate 18.

Reference to FIGURE 2 indicates the mechanism by which the castable liquid material is introduced into the mold. As was previously mentioned, the evacuation of the mold establishes a vacuum influence which tends to eliminate all included entrapped fluids, such as air, and tends also to provide complete penetration and impregnation of interstices of the reinforcing elements. Further, centrifugal force created by the rapid rotation of the mold provides for an additional force to aid in the complete filling of the mold cavity and all the intricate contours of the cavity. Thus, the vacuum forces the entry of the liquid through the tube as indicated by the arrow 29 and onto the distributing plate 18 as indicated by the arrow 30. If the rotation of the mold assembly is in the direction as indicated by 31, the liquid is evenly and rapidly forced outward along the distributing plate in the direction indicated by the arrows 32. Areas of entry between the distributing plate 18 and the outer mold shell 15 are available thereby enabling the liquid to be forced into the cavity area as indicated by the arrow 33. Furthermore, the centrifugal force will constantly aid in a filling of all the mold areas, such as 34, and progressivly will completely fill all the available volumes. The combined action of the centrifugal force and the vacuum will provide for a complete filling of all volumes available within the cavity and will also provide for complete impregnation and penetration of the reinforcements. The rotation is continued until all the material has been added, and the polymerization mechanism has proceeded to a degree as to insure the continued adherence of contour of all volumes by the material.

Figure 6:
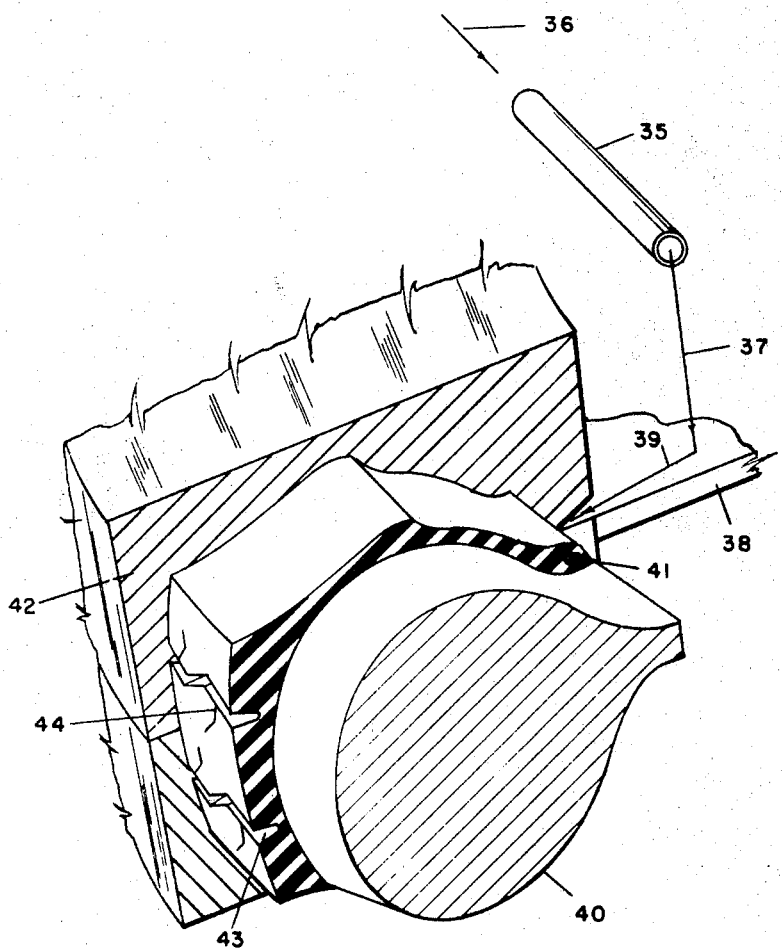
FIGURE 6 is a fragmentary perspective view of a pneumatic tire in a casting assembly, together with a tire cross section formed in accordance with the present invention.

Reference to FIGURE 6 indicates how the same operation is available to the casting of any cavity such as that defining a pneumatic tire or other articles. In a like manner, as was previously indicated, the polymerizable material is introduced through the tube 35 as indicated by the arrows 36 and 37. Upon impingement of the material against the distributing plate 38, the centrifugal force due to the rotation of the mold assembly forces the polymeric material outward in the direction as indicated by 39. The central core or mandrel 40 is capable of supporting reinforcing elements 41 which may serve as beads of the pneumatic tire. Here again, both the evacuation and rotation are necessary for the casting of a satisfactory product. The evacuation is necessary in order to insure the complete impregnation of the interstices of the reinforcing element 41 and to insure also of the elimination of all entrapped minute bubbles. On the other hand, centrifugal force is necessary to insure complete filling of the cavity formed by the mandrel 40 and the mold shell 42. With this type of product the intricate areas which are more difficult to fill are more apparent. In addition to projections on the mold shell which will form the grooves 43 of the tire, very often small, fine slits 44, commonly known as sipes, are also provided in order to increase the traction and stability and generally to improve the riding characteristics of the tire. If additional reinforcement of the tire is desired, it is quite obvious that fiber reinforcements or fabric may also be placed around the mandrel 40 and attached to the bead 41 in order to form a carcass portion of the tire. Regardless, however, of the type of article being formed, it is now obvious that the general procedure is not only applicable, but is necessary in order to insure complete filling of the cavity area and to provide for complete impregnation and penetration of the interstices of the reinforcing elements of the article. As was previously mentioned, such steps are particularly necessary when viscous and rapidly polymerizing casting materials are employed.

It has been found that various types of post casting treatments will impart different resulting physical characteristics. As was previously indicated, mere elapse of time alone is sufficient to provide a sufficient degree of polymerizaiton in order to obtain a satisfactory product. However, it has been found that improved physical characteristics can be obtained if the polymerization is carried out under controlled conditions of time and temperature. Thus, after the cavity has been completely filled, the heating of the evacuation chamber is discontinued and the temperature is allowed to decrease while the rotation is continued for approximately 1 hour. The mold is then removed from the evacuation chamber and allowed to cool for approximately 12 hours at approximately 70° F. Following this treatment the material is then subjected to a temperature of 340° F. for approximately 30 minutes. After the mold and its contents have then cooled, the product may then be removed from the mold.

It has been found that in order to obtain power transmission belts that will give radically improved operating characteristics and resulting belt lift, it is absolutely necessary to obtain complete penetration and impregnation of the interstices of the fiber tensile members by the casting materials. Moreover, however, in addition to the improved life and performance characteristics, it is obvious that the complete impregnation and surrounding of the tensile members insure that the members will be firmly encompassed within and become an integral part of the body portion. In order to position the tensile member within the belt, such tensile member may be tightly wound upon the drum while a proper degree of tension is maintained. According to the load characteristics under which it is desirable to operate the belt, the size of the cord and the type of material used and the degree of packing with relation to the adjacent cord may be varied as desired. Each variation, however, will provide for a different resulting test life, flex characteristic, and load-carrying characteristic. At any rate, it has been discovered that by means of the evacuation and the centrifugal force, the liquid elastomer will completely permeate the tensile layer and, in addition, will flow between the tensile member and the supporting ridges 20, thus firmly and positively integrating the tensile member within the body of the belt. In addition, one may provide for multilayers of tensile members in order to provide a larger load-carrying capacity for the larger size belts.

It is obvious that the contour of the article being cast may be varied at will by varying the configuration of both the mold mandrel and the mold shell. Thus, by providing for wider grooves 21 on the mandrel, it is obvious that positive driven belts containing teeth segments may be formed in an inverted or upright manner. Moreover, the tensile section will still be integrated at the base of the teeth elements in such a way as to be completely encompassed within the main portion of the belt, thus eliminating the necessity of applying a cover or wrap over the body of the belt.

It is obvious from the foregoing discussions that various types of belt configurations are available. In addition to lending itself to the availability of incorporation of reinforcing elements, the method is available for the production of a plurality of belts in the form of a sleeve by means of a single operation. Moreover, the invention is not limited to the formation of power transmission belts, but is available for satisfactory production of tires or any other shaped articles of manufacture which are to be formed of castable materials.

Essentially, the invention is seen to consist of the casting of viscous polymerizable materials which flow only with the greatest of difficulty and only for a relatively short period before solidification or polymerization has progressed to such an extent as to preclude further formation of shape during the casting operation. The viscous material is essentially introduced under the influence of the vacuum which not only enhances the flow of the material, but also insures complete impregnation and permeation of interstices of reinforcing elements supported within the cavity. Furthermore, the influence of vacuum insures the elimination of minute bubbles or void areas which may be encountered in large casting operations. The simultaneous influence of centrifugal force arising from the rotation of the assembled mold during the introduction of the viscous material also insures the complete filling of large volume mold cavities and further provides for the elimination of non-fill areas or entrapped portions of the cavity. In addition, complete filling of even the most intricate contours is possible by means of the influence of the centrifugal force. Further, such incorporation of the reinforcing elements by virtue of this process is provided that complete integration of such elements is made within the cast article. This casting process not only enables one to successfully cast articles from extremely viscous and rapidly polymerizing material, but it also enables one to fill large cavities. The process is much simplified over existing methods in that a unified operation is provided whereby the entire article is cast and fabricated simultaneously. Furthermore, as has been pointed out in the case of power transmission belts, it is essential for the satisfactory life performance of the belt that the tensile member be so integrated and permeated by the casting material. Because of the subsequent polymerization or curing upon the mandrel and the post treatment available, such cast articles exhibit practically no shrinkage or growth characteristics. The procedure is such that a high degree of dimensional stability is imparted to the cast article. Also, because of the complete integration and incorporation of the reinforcing elements within the article, such material from which the reinforcing element is protected from being adversely affected by moisture or humidity during storage.

The process herein described in leading to the complete integration of many reinforcing elements with the body portion of the article has additional advantages. If in a belt structure, the tensile member should fail for some reason, such failure in a conventionally constructed belt will lead to early failure of the article because of its adverse effect on adjacent regions to the failed area. Such is not the case, however, in the articles resulting from the present process wherein the reinforcing cord is completely impregnated by the material and integrated into the article. It has been pointed out that the cord has been completely impregnated by the polymeric material and is completely encompassed by any surrounding polymeric material. Such encompassment and integration prevents a failed area from breaking loose from its surroundings so as to abraid against surrounding areas thereby enlarging the failed area. In other words, with a power transmission belt even though the cord might rupture in one area, the belt continues to operate as a unit structure.

The initial casting operation readily lends itself to any further desirable fabrication steps. Thus, if it is desired that the belts contain an outer fabric wrap, the cast and polymerized article is perfectly capable of undergoing such operation. By virtue of the degassing process, the evacuation process, and the influence of the centrifugal force, complete elimination of entrapped air or moisture or other gases from the material is obtained. Further, all void spaces are eliminated and the tensile member is not only completely impregnated by the material, but is also completely encompassed by the material thus eliminating the possibility of attack by undesirable surrounding elements.

The foregoing detailed description has been given for the purposes of illustration only and is not intended to limit the scope of the present invention which is to be determined from the appended claims.

What is claimed is:

1. A method for casting an article of manufacture from a viscous liquid elastomeric material comprising the steps of: positioning a mold mandrel portion concentrically within a mold shell portion thereby forming a cavity between said mandrel portion and said shell portion and defining the contour of the article to be cast; applying a vacuum to the cavity formed between said mandrel and shell to exhaust gases from said cavity; simultaneously spinning the assembled mold around an axis of rotation of the mold; introducing a polymerizable liquid elastomeric material into the spinning mold while maintaining the vacuum; completely filling the cavity and preventing the formation of any occluded voids or bubbles by continuing to maintain the spinning and vacuum until the filling of said mold is complete; polymerizing the resultant product to form a unitary structure.

2. A method for casting power transmission belts from a liquid elastomeric material comprising the steps of: supporting a fibrous strain resisting member upon a mold mandrel; concentrically positioning said mold mandrel within a mold shell thereby defining a cavity having the desired contour of the belt; applying a vacuum to the cavity thereby formed between the mold mandrel and the mold shell to exhaust gases from said cavity; rapidly spinning said evacuated mold upon an axis of rotation; introducing a liquid elastomeric material into said evacuated cavity of the spinning mold and filling the cavity while simultaneously maintaining the vacuum and spinning of the mold until the casting is complete, thereby impregnating the fibrous strain resisting element; polymerizing the resultant formed product into a sleeve containing a plurality of unitary belt members.

3. A method of casting a tire from a liquid elastomeric material comprising the steps of: supporting a reinforcement element upon a core member; positioning said core member concentrically within a mold shell thereby defining a cavity describing the desired contour of said tire; spinning said mold assembly upon an axis of rotation; applying a vacuum to said mold cavity formed by said core member and said mold shell to exhaust gases from said cavity; introducing a liquid elastomeric material into the rotating mold cavity and completely encompassing the reinforcing element while continuing to maintain the spinning and vacuum until the casting is complete; polymerizing the resultant product to form a unitary tire structure.

4. A method of casting an article of manufacture from a viscous polymerizable liquid material comprising the steps of: applying a vacuum to a mold cavity defined by a mold shell and a mold mandrel to exhaust gases from said cavity; rapidly rotating said mold around an axis of rotation; introducing a predetermined amount of degassed liquid material into the cavity of said rotating mold and preventing the formation of any occluded voids or bubbles by continuing to maintain the spinning and vacuum until the casting is complete; and polymeriziing the liquid material within said mold cavity until a rigid unitary structure is formed.

5. A method of casting a sleeve containing a plurality of power transmission belts from a viscous polymerizable liquid material comprising the steps of: applying a vacuum to exhaust gases from a mold cavity defined by a mold shell and a concentrically placed mold mandrel containing a supported strain resisting element within said mold cavity; rapidly rotating said mold around an axis of rotation; introducing a predetermined amount of degassed liquid material into the cavity of said spinning mold structure thereby filling the mold cavity and encompassing and impregnating said supported strain resisting element by continuing to maintain the spinning and vacuum until the casting is complete; polymerizing the liquid material within said mold cavity until a rigid sleeve of power transmission belts is formed.

6. A method of casting an article of manufacture from a viscous polymerizable liquid material comprising the steps of: supporting a reinforcing element within a mold cavity defining the desired contour of the article to be formed; applying a vacuum to the mold cavity to exhaust gases therefrom and spinning the mold defining the mold cavity around an axis of rotation of said mold thereby inducing a centrifugal force; introducing a predetermined amount of degassed liquid polymerizable material into the mold cavity under the influence of vacuum and centrifugal force so as to completely impregnate the reinforcing element with said polymerizable material and completely introducing said polymerizable material to all portions of said mold cavity by continuing to maintain the vacuum and centrifugal force until the casting is complete; followed by polymerizing the article formed within the mold cavity into a unitary product.

7. The method of casting a power transmission belt from a viscous polymerizable liquid material comprising the steps as defined in claim 6 wherein said reinforcing element is a fibrous material forming a strain resisting member of said power transmission belt.

8. The method of casting a power transmission belt from a viscous polymerizable liquid material comprising the steps as defined in claim 6 wherein said reinforcing element is a bundle of wires forming a strain resisting member of said power transmission belt.

9. The method of casting a tire from a viscous polymerizable liquid material comprising the steps as defined in claim 6 wherein said reinforcing element forms the bead elements of said tire.

10. The method of casting a power transmission belt from a viscous polymerizable liquid material comprising the steps of: supporting a strain resisting member upon a mold mandrel; concentrically enclosing said mold mandrel within a mold shell thereby defining a cavity having the desired contour of said power transmission belt; applying a vacuum to the cavity formed between the mold mandrel and the mold shell to exhaust gases from said cavity; rapidly rotating said evacuated mold upon an axis of rotation; introducing a predetermined amount of degassed liquid polymerizable material into the cavity of the spinning mold thereby filling the cavity and completely encompassing and impregnating the strain resisting element by continuing to maintain the vacuum while rotating the mold until the casting is complete; polymerizing the liquid material until it has become rigid to the extent of maintaining the contour defined by the mold cavity; removing the outer mold shell; further polymerizing the rigid material in an atmosphere of elevated temperature; maintaining the dimensions of said polymerized material and said strain resisting member upon the mold mandrel while the formed power transmission belt is allowed to cool thereby imparting dimensional stability to said belt; and finally removing the resultant unitary belt and fabricating it into its desired final shape.

11. The method of casting a power transmission belt from a viscous polymerizable liquid material comprising the steps of: supporting a strain resisting element upon a mold mandrel; inserting said mold mandrel concentrically within a mold shell thereby defining a cavity having the desired contour of said power transmission belt; applying a vacuum to the cavity formed between the mold mandrel and the mold shell to exhaust gases from said cavity; rapidly rotating said evacuated mold upon an axis of rotation; introducing a predetermined amount of degassed liquid polymerizable material into the spinning mold thereby filling the cavity and completely encompassing and impregnating the strain resisting member by continuing to maintain the vacuum and rotation of the mold until the casting is complete; polymerizing the liquid material until it has become rigid to the extent of maintaining the contour defined by the mold cavity; removing the outer mold shell and further polymerizing the material while retaining the cast belt on the inner mold mandrel thereby stabilizing the dimensional characteristics of said strain resisting member and the polymerized material.

12. The method of casting a power transmission belt from a viscous polymerized material comprising the steps of: supporting a strain resisting member upon a mold mandrel; concentrically enclosing said mold mandrel within a mold shell thereby defining a cavity having the desired contour of said power transmission belt; applying a vacuum to the cavity formed between the mold mandrel and the mold shell to exhaust gases from said cavity; rapidly rotating said evacuated mold upon an axis of rotation; introducing a predetermined amount of liquid polymerizable material into the spinning mold which amount is sufficient only to partially fill the outer volume of the cavity; then introducing an additional amount of a liquid polymerizable material having characteristics different than the first polymerizable material introduced into the cavity thereby filling the remaining cavity volume and forming a laminate structure caused by the introduction of two different characterized materials while continuing to maintain the rotation and vacuum until the introduction of the materials is complete; polymerizing the resultant belt to form a unitary structure.

13. The method of casting a power transmission belt from a viscous polymerizable liquid material comprising the steps of: supporting a strain resisting member upon a mold mandrel; introducing a stiffening material from the group consisting of linters, unwoven fabric, woven fabric and flock into a mold shell; inserting said mold mandrel concentrically within the mold shell thereby defining a cavity having the desired contour of said power transmission belt; applying a vacuum to the cavity formed between the mold mandrel and the mold shell to exhaust gases from said cavity; rapidly rotating said evacuated mold upon an axis of rotation; introducing a predetermined amount of degassed liquid polymerizable material into the mold thereby filling the cavity and completely encompassing and impregnating said strain resisting member and said stiffening material by continuing to maintain the rotation and vacuum until the casting is complete; polymerizing the resultant product to form a unitary structure.

14. The method of casting a power transmission belt from a viscous polymerizable liquid material comprising the steps of: supporting a strain resisting member upon a mold mandrel; inserting said mold mandrel concentrically within a mold shell thereby defining a cavity having the desired contour of said power transmission belt; applying a vacuum to the cavity formed between the mold mandrel and the mold shell to exhaust gases from said cavity; imposing a differential pressure gradient between the cavity formed within the mold and the exterior of the cavity; introducing an amount of degassed liquid polymerizable material into the cavity under the influence of the pressure gradient and the vacuum pressure thereby filling the cavity and completely encompassing and impregnating the strain resisting element by continuing to maintain the vacuum and differential pressure gradient until the casting is complete; polymerizing the resultant product to form a unitary structure.

References Cited by the Examiner

UNITED STATES PATENTS

| 2,422,266 | 6/47 | Steinke. | |
|---|---|---|---|
| 2,456,580 | 12/48 | Carter et al. | |
| 2,477,273 | 7/49 | Tognola. | |
| 2,507,852 | 12/52 | Case | 74—237 |
| 2,803,054 | 8/57 | Kohring | 264—101 |
| 2,937,408 | 5/60 | Limpel | 264—311 |
| 3,068,710 | 12/62 | Beckadolph et al. | 74—237 |
| 3,083,583 | 4/63 | Szonn | 74—229 |
| 3,103,703 | 9/63 | Ludewig | 264—275 |
| 3,114,173 | 12/63 | Boggs et al. | |

ALEXANDER H. BRODMERKEL, *Primary Examiner.*
MORRIS LIEBMAN, *Examiner.*